(No Model.)
F. HIRST.
BUTTER CUTTING APPARATUS.
No. 267,205. Patented Nov. 7, 1882.
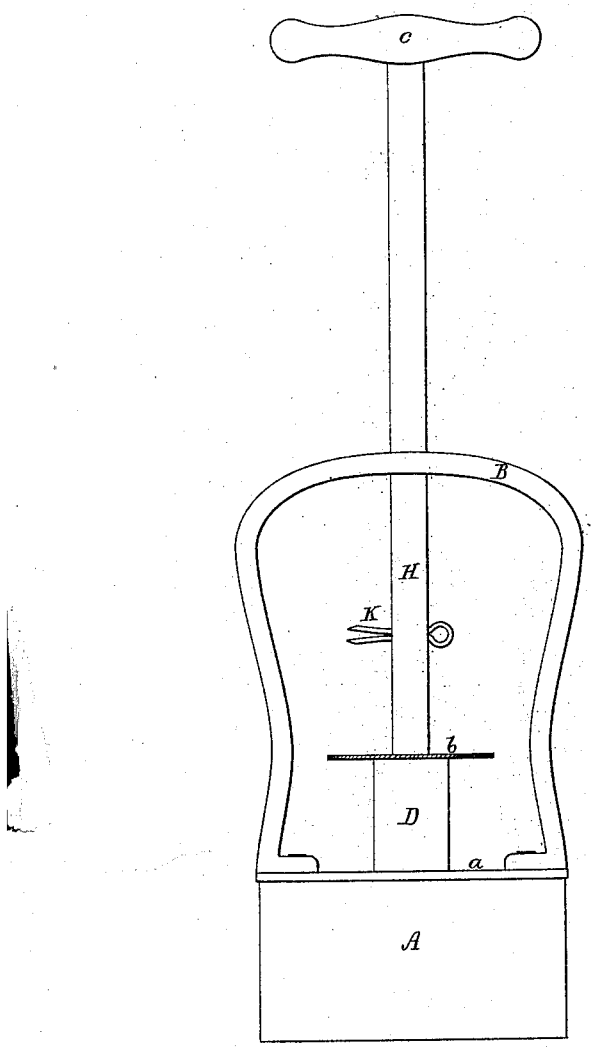
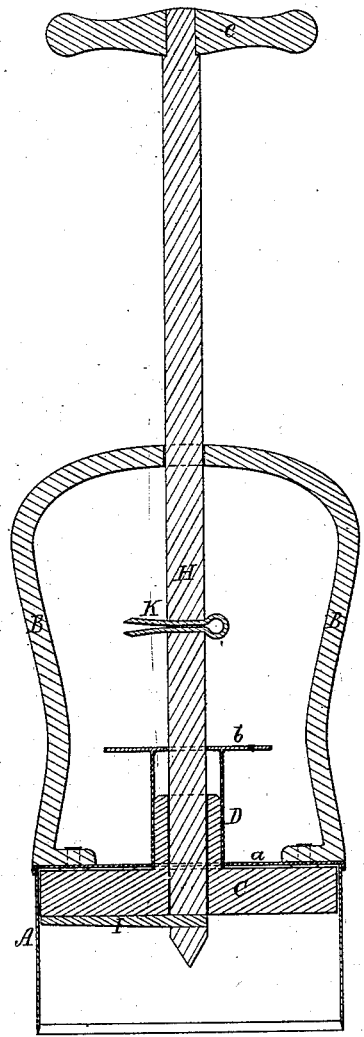
Witnesses.
S. N. Piper
E. B. Pratt
Inventor
Frank Hirst.
by R. H. Eddy atty

UNITED STATES PATENT OFFICE.

FRANK HIRST, OF PITTSFIELD, ASSIGNOR TO JAMES MASON, OF DALTON, MASSACHUSETTS.

BUTTER-CUTTING APPARATUS.

SPECIFICATION forming part of Letters Patent No. 267,205, dated November 7, 1882.

Application filed May 15, 1882. (No model.)

*To all whom it may concern:*

Be it known that I, FRANK HIRST, of Pittsfield, in the county of Berkshire, of the State of Massachusetts, have invented a new and useful or Improved Butter-Cutting Apparatus; and I do hereby declare the same to be described in the following specification and represented in the accompanying drawings, of which—

Figure 1 is a side elevation, and Fig. 2 a longitudinal and transverse section, of it.

The machine constituting my present invention is like that described in Letters Patent No. 187,275, dated February 13, 1877, granted to me, excepting that, while I retain the open mold and its handle, the stamp and its tubular handle, and the central rod and its handle and knife, I have wholly dispensed with the slotted tube and its collar and head; and instead of jointing or hanging the knife to the rod, so that such knife may be turned either into line with or at a right angle to the rod, I have permanently fixed the knife or cutter to the rod, and at a right angle therewith, so as to be immovable relatively to such rod while the mold may be in use, the knife under such an application of it enabling the rod to effect retraction of the stamp within the mold and the said headed and slotted tube and its collar to be dispensed with, the butter-mold being thereby rendered simpler and cheaper in construction and easier worked.

In such drawings, A denotes the mold, open at its mouth or lower end, and provided with a bow-shaped handle, B, arranged with it as shown, such mold being cylindrical or otherwise properly shaped. A stamp, C, is arranged within such mold and fixed to a tubular handle, D, which projects loosely through the mold-head *a* in manner as shown, and is provided with a head, *b*, formed and applied to it as represented. Centrally through the handle D, stamp C, and the mold-handle B there is arranged a rod, H, to slide lengthwise within such parts, such rod at its upper end being provided with a handle, *c*, while at its lower end it is conical or pointed, and there has permanently fixed in or to it and to project from it at a right angle with it an arm, cutter, or knife, I, such being so that while such arm, cutter, or knife may be in connection with the rod they shall retain their normal positions relatively to each other. Furthermore, there extends through the rod laterally a furcated pin, K, which, by bringing up against the head *b*, determines the extent of downward or forward movement of the rod H.

To use this butter-mold, grasp the mold-handle with the left hand, so that the knife-rod shall be between the thumb and second and third fingers of such hand, and force the mold down into the butter, after which the knife, with its rod, is to be pressed forward until the pin K brings up against the head *b*. Next revolve the said rod so as to cause the knife to move around in a circle within the butter. Next give the mold a slight turn in and extract it from the butter, after which draw backward the rod, so as to carry the knife through the butter in the mold and up to the stamp. Next, taking hold of the head *b*, force the stamp forward and crowd the butter out of the mold, and loosen it from the stamp by revolving the rod and the knife. Next, by drawing backward the rod the stamp will be retracted in the mold and up to its head.

I do not herein claim a butter molding and stamping machine composed of an open mold and its handle, a stamp and its tubular handle, a slotted tube, a head, a rod, and an arm or knife, as and arranged and applied as set forth in my said Patent No. 187,275, as I have by my present combination dispensed, as hereinbefore mentioned, with certain parts or elements of the said butter molding and stamping machine, and have thereby produced a new and simpler combination of parts, by which I do not stamp or print the butter with any characters or ornamental devices in relief or otherwise, but simply remove from a mass of butter a cylindrical portion thereof, to be subsequently otherwise printed or stamped or finished. In my patented machine a tubular piston-rod provided at its lower end with a head was necessary for the expulsion of the butter from the rod provided with the knife or cutter; but in my present machine such devices are not used or needed, the butter being discharged by other means, as hereinbefore set forth.

What I claim as my present invention is as follows, viz:

The combination of the mold and its handle with the stamp and its handle, arranged within and concentrically with such mold, and with the plunger-rod arranged concentrically in the stamp and provided with the knife permanently attached to it (the said rod) at a right angle to it, as set forth.

FRANK HIRST.

Witnesses:
JAMES MASON,
SARAH D. RICE.